(12) United States Patent
Nieweglowski et al.

(10) Patent No.: US 6,272,178 B1
(45) Date of Patent: Aug. 7, 2001

(54) VIDEO DATA ENCODER AND DECODER

(75) Inventors: Jacek Nieweglowski, Szczecin (PL);
Mustafa Ali Tûrker, Ankara (TR); Ossi Kalevo; Petri Haavisto, both of Tampere (FI)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/171,262
(22) PCT Filed: Apr. 18, 1996
(86) PCT No.: PCT/EP96/01628
 § 371 Date: Oct. 15, 1998
 § 102(e) Date: Oct. 15, 1998
(87) PCT Pub. No.: WO97/40630
 PCT Pub. Date: Oct. 30, 1997
(51) Int. Cl.[7] ....................................... H04N 7/12
(52) U.S. Cl. ...................... 375/240.03; 375/240.16; 382/232; 382/240; 382/246
(58) Field of Search ..................... 348/699; 375/240, 375/405, 407, 406

(56) References Cited

U.S. PATENT DOCUMENTS

| 5,151,784 | * | 9/1992 | Lavagetto et al. | 375/240.12 |
| 5,260,782 | * | 11/1993 | Hui | 348/699 |
| 5,500,689 | * | 3/1996 | Lam | 348/699 |
| 6,084,908 | * | 7/2000 | Chiang et al. | 375/240 |

* cited by examiner

*Primary Examiner*—Chris Kelley
*Assistant Examiner*—Shawn S. An
(74) *Attorney, Agent, or Firm*—Perman & Green, LLP

(57) ABSTRACT

This invention relates to compression of prediction error in motion compensated video coding schemes. Prediction frame and motion vectors are used to extract useful information about the properties of the prediction error signal, e.g. its location, directionality, etc. This information does not need to be transmitted because the decoder of the proposed system includes means to extract this information. Information extracted by the encoder and decoder is used to adapt prediction error coding scheme which gives substantial bitrate reductions.

15 Claims, 6 Drawing Sheets

SUBBLOCK ru (i-1,j+1)  (i,j+1)

(i-1,j)  (i,j)

SUBBLOCK lu (i,j)  (i+1,j)

(i,j-1)  (i+1,j-1)

SUBBLOCK rl (i-1,j)  (i,j)

(i-1,j-1)  (i,j-1)

SUBBLOCK ll

VIDEO DATA ENCODER AND DECODER

The present invention relates to an encoder for performing motion compensated encoding of video data as well as to a decoder for decoding motion compensation encoded video data. The present invention furthermore relates to a method of motion compensated encoding of video data and a method of decoding motion compensation encoded video data.

Motion compensating (MC) video encoders and decoders utilize the fact that consecutive frames of a typical video sequence show a high degree of similarity with each other and the fact that the difference between consecutive frames is mostly caused by motion in the scene. In this way, motion compensating video encoding enables compressing the amount of video data as is known for instance from Proceedings of IEEE, volume 73, No. 4, pages 523–548, April 1995, H. Mussiuann, P. Pirsch und H. Grallert: "Advances in Picture Coding". Instead of compressing each frame $I(x,y)$ of a video sequence separately, MC video encoders compress the difference between a current video frame which has to be coded and a so called prediction frame $P(x,y)$ which is calculated in the encoder and represents an estimate of the current video frame $I(x,y)$ based on one or more of the previous video frames. The compressed difference between the current video frame $I(x,y)$ and the prediction frame $P(x,y)$ can be used by a video decoder for reconstructing the current video frame $I^*(x,y)$ by means of performing a similar prediction of the frame as performed by the encoder and by means of correcting this prediction frame based on the received difference between the prediction frame $P(x, y)$ and the actual frame $I(x, y)$.

It is common in the video coding art that different areas of the image are coded using different coding modes. This is the case in all modern video codecs such as the ITU H.261 and H.263 as well as the MPEG-1 and MPEG-2 video coding standards. For example, some of the image areas are coded without using any temporal prediction (so-called intra-blocks). Therefore, the term "frame" stands in the following for the areas of the frame subject to motion compensated encoding and decoding. It is to be noted that with the term "frame" in the context of motion compensated video coding and decoding no limitation to the specific case that no intrablocks are present, is intended.

Both the encoder as well as the decoder base the prediction of the current frame $I(x,y)$ on estimated motion vectors which are calculated in the encoder by means of motion estimation. The estimated motion vectors are used in the encoder for constructing the prediction frame P based on which the encoder can calculate the prediction error frame $E(x,y)$, i.e. the difference between the current frame I and the prediction frame. Moreover, the prediction error frame $E(x, y)$ and the estimated motion vectors describing estimated pixel displacements of the current frame I relative to the reference frame R are communicated to the decoder for prediction of the current frame P based on the motion vectors and correction of the prediction frame based on the communicated prediction error, thus constructing the current frame $I^*(x,y)$.

In order to further reduce the amount of data communicated to the decoder, the encoder performs compression of the prediction error. As a result of compression of the prediction error and decompression of the compressed prediction error, the decompressed prediction error frame $E^*(x,y)$ may be slightly different from $E(x,y)$. The encoder takes account of this slight deviation by means of basing motion estimation and calculation of the prediction frame $P(x,y)$ as well as calculation of the prediction error frame $E(x,y)$ not on preceding original frames I but rather on preceding frames $I^*$ reconstructed by the encoder in a way similar to the reconstruction performed by the decoder.

For motion estimation both reconstructed frames $I^*$ or original frames I can be used.

The compression of the prediction error frame $E_n(x,y)$ is typically achieved by partioning the whole frame into smaller areas and by applying an appropriate compression method to each of these areas. The term "area" stands for a number of pixels forming a contiguous spatial two dimensional block in a frame. The prediction error is typically concentrated in only few areas whereas in the remaining areas it is very small or zero. Accordingly, the compressed prediction error data conventionally comprise two types of information, namely addressing information specifying the areas of the prediction error frame which are coded, and furthermore the values of the compressed prediction error in these areas.

From Proc. of 1992 European Conference on Signalling Processing EUSIPCO, pages 1357–1360, N. Noresco, F. Lavagetto and F. Cocurullo, "Motion Adaptive Vector Quantization for Video Coding" an algorithm for motion adaptive video coding is known according to which video input frames are subdivided into three dimensional (spatio-temporal) blocks of fixed size and are segmented depending on the motion activity in each block. Depending on the motion content, the blocks are subsampled in time by skipping a certain number of frames. The 2 dimensional spatial slices of the block which have not been skipped, are vector quantized and coded. At the receiver the spatial slices of each block which have been transmitted are decoded and the slices in between are linearly interpolated leading to the reconstruction of the whole block.

It is the object of the present invention to improve encoding and decoding of video data such that higher encoding efficiency can be achieved and the bit rate of the encoded video data can be further reduced.

According to the present invention, this object is solved by an encoder for performing motion compensated encoding of video data according to claim 1 and furthermore by a decoder for decoding motion compensation encoded video data according to claim 15. Moreover, this object is solved by a method of motion compensated encoding of video data according to claim 32 and also by a method of decoding motion compensation encoded video data according to claim 33. Embodiments of the invention are defined in the dependent claims.

According to a first aspect of the present invention, properties of the prediction frame and/or properties of the motion vectors are utilized for reducing the bit rate of coded video data and hence, for improving the coding efficiency of video data. Prediction error concentrates along the contours of moving objects in a video scene. The invention is based on the observation that structures in the prediction frame $P(x,y)$, i.e. spatial variations or patterns of luminance and/or chrominance pixel values, e.g. edges and the like, approximately coincide with locations of these contours of moving objects. Throughout this document the term "discontinuity of image brightness" denotes such general structures of the prediction frame. The prediction frame $P(x,y)$ in turn is known both to the encoder and the decoder as soon as motion vectors are transmitted. Accordingly, based on the prediction frame it is possible to determine both in the encoder and in the decoder, which areas in the prediction error frame are significant and are to be encoded and decoded, respectively, without the need of transmitting address information regarding such areas of the prediction error frame contained in the encoded video data.

The present invention is furthermore based on the recognition that the prediction error concentrates in areas of high motion activity. Accordingly, properties of the motion vectors available both in the encoder as well as in the decoder can be used for determining significant areas of the prediction error frame which are to be encoded by the encoder and which are to be decoded by the decoder, without the need of including address information in the coded video data regarding the significant areas of the prediction error frame.

A preferable video data coding scheme according to this aspect of the present invention makes use both of structural characteristics of the prediction frame available both in the encoder and in the decoder as well as of the properties of the motion vectors estimated in the encoder and communicated to the decoder, for determining areas of the prediction error frame that have to be encoded by the encoder, and for determining in the decoder which areas of the prediction error frame are contained in the encoded video data.

Preferably, for encoding a frame of video data, the prediction error frame is partitioned into a plurality of areas. The prediction frame is divided into areas in a way similar to the partitioning of the prediction error frame such that for each area in the prediction error frame there exists a corresponding area in the prediction frame. The decoder partitions the prediction frame in the same manner as the encoder and restores the prediction error frame from the received coded video data in each of the corresponding areas of the prediction error frame which are contained in the received coded video data. The frames can be partitioned into areas of predetermined size and shape or into areas of varying size and shape. Partitioning frames into areas can be performed adaptively. Size and shape of each area may depend on local motion activity and/or local structural characteristics of the prediction frame, e.g. on a degree of local discontinuities of the prediction frame.

Preferably, after the encoder has accomplished frame partitioning in a predetermined or adaptive manner, the encoder employs a predetermined sequence rule for determining areas of the prediction error frame which have to be encoded. This sequence rule is known in advance to the decoder. As an example of such a sequence rule, the encoder scans the array of areas resulting from frame partitioning line by line for areas to be encoded and encodes all areas to be encoded in the order in which they are found. The decoder is then able to restore the prediction error frame from the received prediction error data based on the partitioning of the prediction frame, based on information extracted from the prediction frame and/or from the motion vectors regarding which areas of the prediction error frame are coded, as well as on said sequence rule.

Moreover, according a second aspect of the present invention all areas or selected areas of the prediction error frame are coded using an adaptive coding scheme. Selected areas can be the areas of the prediction error frame determined to be significant in accordance with the first aspect of the invention. The adaptive coding scheme can take account of different property classes of the respective prediction error frame areas to be coded. Examples of adaptive coding schemes include classified vector quantization schemes based on a number of code books each designed for one of said property classes, orthogonal transforms, matching pursuit techniques etc., all as such well known in the art. Application of classified vector quantization for coding of video data is as such described e.g. in Signal Processing, Elsevier, vol. 26, 1992, pages 265, H.-H.-Chen, Y.-S. Chen and W.-H.Hsu: "Low rate sequence image coding via vector quantization" or in IEEE International Conference on image processing ICIP 1994, vol. 2, pages 452, K. Zhang, M. Bober and J. Kittler: "Robust motion estimation and multistage vector quantization for sequence compression" and also in IEEE International Conference on Acoustics, Speech and Signal Processing ICASSP'94, Vol. 5, pages 417, S. Liu: "Rate distortion analysis of variable block size VQ-based motion compensated video codecs". According to the present invention, when using an adaptive encoding scheme, e.g. classified vector quantization, orthogonal transformations, matching pursuit schemes, etc., for coding areas of the prediction error frame, a bit rate reduction can be achieved by means of extracting the classification information (e.g. coding method selection information) from properties of the prediction frame which is available both in the encoder as well as in the decoder such that no classification information needs to be included in the encoded video data. When using adaptive encoding of areas of the prediction error frame, as an alternative or in addition to extracting classification information from areas of the prediction frame corresponding to areas of the prediction error frame to be encoded, properties of motion vectors can be used for classification, for instance code book selection, for each coded area of the prediction error frame, without the need of including classification information in the encoded video data.

According to this aspect of the present invention, the extracted classification information can indicate a specific coding method for encoding the respective area of the prediction error frame or can indicate a group of different coding methods. According to an advantageous implementation of this aspect of the present invention the classification information is used for selecting an area encoder for each area to be encoded among a plurality of area encoders each adapted to the particular properties of a corresponding property class. Each area encoder in turn has a group of different coding methods available, and the best coding method is selected among the group by the video encoder and coding method selection information is sent to the video decoder. The amount of coding method selection information to be transmitted to the video decoder can be kept low if the coding method selection information is entropy encoded, taking advantage of non-uniform distributions of coding method selection probabilities for each area encoder. If for each property class, i.e. for each area encoder, one or a small number of coding methods are very likely to be selected, their selection can be indicated to the video decoder with a small number of bits while the selection of a coding method with a smaller selection probability can be indicated to the video decoder with a higher number of bits.

The selection of a particular coding method among all coding methods provided in the selected area encoder can be performed by the video encoder on the basis of information not available for the video decoder, e.g. on the basis of an original video data frame input, on the basis of the individual structure of the pixel values in the area to be encoded of the prediction error frame, etc. The video decoder is then able to select the area encoder on the basis of the properties of the prediction frame available in the video decoder and on the basis of coding method selection information communicated by the video encoder.

This implementation of this aspect of the present invention is advantageous in that it can improve the performance of the video encoder and video decoder in situations when the classification based on properties of the prediction frame and/or properties of the motion vector field leaves some uncertainty regarding the properties of the respective area to be encoded of the prediction error frame. With this implementation, even in such situations a highly adaptive and precise coding method selection among a very large number of different coding methods is possible with a very small amount of selection information to be sent to the video decoder.

Having regard to the distribution of coding method selection probabilities for each area encoder, the coding method selection information preferably is entropy encoded prior to transmission to the video decoder. An equivalent modification provides a default coding method among the plurality of coding methods of each area encoder, and the video encoder performs a check whether the default coding method of the area encoder selected in accordance with the classification is satisfactory according to an appropriate criterion for encoding the respective area of the prediction error frame. If the default coding method of the selected area encoder is found to perform satisfactorily, no coding method selection information is transmitted by the video encoder to the video decoder and the video decoder uses a default decoding method corresponding to the default coding method adopted by the video encoder. Otherwise the video encoder selects an appropriate coding method overriding the default and transmits corresponding selection information to the video decoder.

In the following, preferred embodiments of the present invention will be described with reference to the accompanying drawings.

FIG. 7 shows subblocks for calculation of pixel activity measures;

Figure 1:
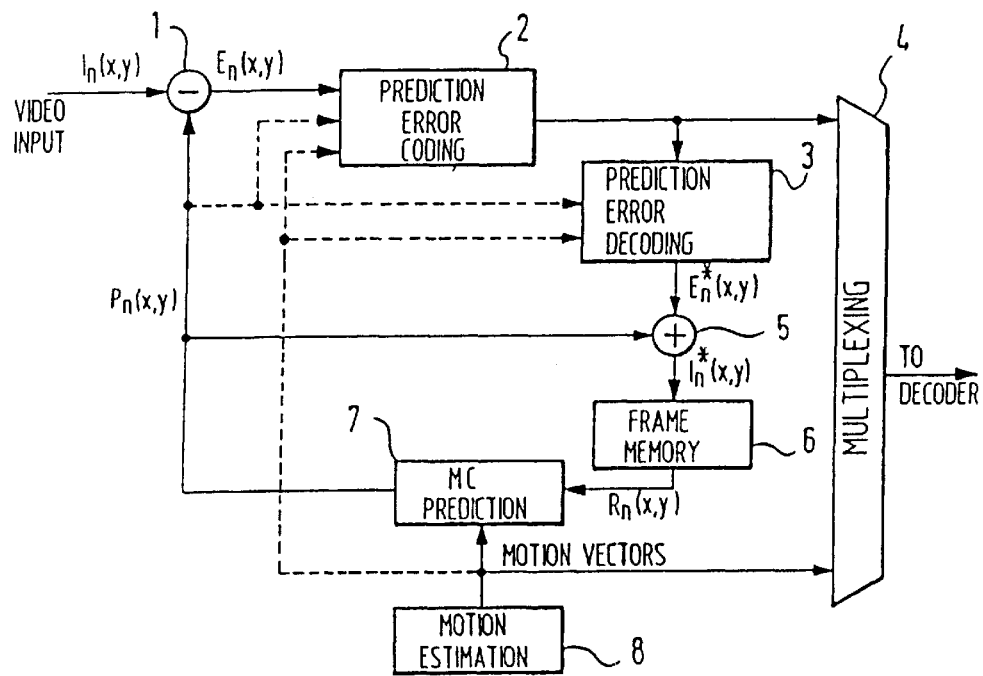
FIG. 1 shows a block diagram of a first embodiment of a motion compensating video encoder according to the present invention.

FIG. 1 shows a block diagram of an embodiment of a video encoder according to the present invention. In this Figure, reference numeral 1 denotes means for calculating a prediction error frame E(x,y) from the difference between a video frame input I(x,y) and a prediction frame P(x,y). Reference numeral 2 denotes a prediction error encoding block and 3 denotes a prediction error decoding block. Reference numeral 5 represents calculation means for calculating a reconstructed video frame I*(x,y) from the prediction frame P(x, y) and the decoded prediction error frame E*(x, y). 6 denotes a frame memory for storing the restored video frame I*(x,y) and for providing a reference frame R(x,y) used by motion compensated predictor 7 for calculating a prediction frame. 8 denotes a motion estimator for estimating motion vectors and supplying the estimated motion vectors to MC prediction block 7. 4 denotes a multiplexer receiving prediction error data output by prediction error coder 2 as well as motion vectors output by motion estimator 8 and for multiplexing the prediction error data and the motion vectors for transmission to a decoder.

Prediction error encoding block 2 of this embodiment is adapted to receive not only the prediction error frame E(x,y) output by calculation means 1, but also the prediction frame P(x,y) as well as motion vectors estimated by motion estimator 8. Moreover, prediction error decoding block 3 receives not only prediction error data output by prediction error coding block 2 but also the prediction frame P(x,y) and the motion vectors output by motion estimator 8.

The video encoder of FIG. 1 operates as follows. For each incoming frame of video data I(x,y) the encoder predicts a prediction frame P(x,y) and compares the prediction frame P(x,y) with the actual incoming video frame I(x,y). This comparison is performed by calculating means 1. Prediction error frame E(x,y) is then supplied to block 2 and subjected to prediction error encoding in order to generate compressed prediction error data for transmission to a decoder. Compression of the prediction error frame E(x,y) might lead to some loss of information. In view of the fact that the video decoder (not shown in FIG. 1) receives from the video encoder the compressed prediction error data rather than the prediction error frame E(x,y), the video decoder will have to base the prediction of the actual video frame not on the prediction error frame E(x,y) but rather on a restored prediction error frame E(x,y) obtained from decoding the compressed prediction error data. In order to avoid deviations between the prediction frame P(x,y) in the encoder and in the decoder, the video encoder decodes the prediction error data output by prediction error encoder 2 in the same manner as the video decoder for obtaining a restored prediction error frame E*(x,y), and prediction is performed not on the basis of the actual incoming video data frame I(x,y) but on the basis of a reconstructed video data frame I*(x,y) which corresponds to a video data frame that can be reconstructed by a video decoder based on the prediction error data output by block 2.

Motion estimator 8 analyzes the scene motion from a sequence of incoming video data I(x,y) and estimates motion vectors describing the displacement of each pixel in the subsequent video frame. These estimated displacements are then used by MC predictor 7 to modify the current reconstructed video frame I*(x,y) according to the estimated displacements in order to arrive at a prediction frame P(x,y) for the subsequent video frame I(x,y).

Prediction error encoding and decoding as well as generating a prediction frame based on motion estimation is as such well known in the art. A large amount of papers on motion estimation and motion compensated prediction has already been published. Details on these subjects are readily available in the literature such that there is no need to discuss these issues not immediately related to the present invention in greater detail.

The prediction error encoder 2 performs encoding of the prediction error frame E(x,y) by means of partitioning the prediction error frame into a plurality of areas. Moreover, the prediction error encoder 2 receives and analyses the prediction frame P(x,y) as indicated by respective dashed lines in FIG. 1. In addition, the prediction error encoder 2 receives information on the motion vectors estimated by motion estimator 8 as indicated by respective dashed lines in FIG. 1. Based on this, the prediction error encoder 2 is in a position to determine which of the areas of the prediction error frame E(x,y) have to be encoded and which areas of the prediction error frame do not contain significant information and do not need to be communicated to the decoder. The prediction error encoder 2 performs this determination based on an analysis of properties of the prediction frame and based on an analysis of the estimated motion vectors, both the prediction frame as well as the motion vectors being available also in the decoder receiving the coded video data. The prediction error encoder 2 of the present invention makes use of the fact that significant information in the prediction error frame E(x,y) concentrates along the contours of objects moving in the video scene. While the exact contours of the moving objects are not known to the decoder, structural characteristics, e.g. discontinuities of image brightness, edges and the like, of the prediction frame P(x,y) available both in the encoder and in the decoder, approximately coincide with the locations of these contours. Hence, the prediction error encoder can determine approximate locations of significant areas of the prediction error frame from the structural characteristics of the prediction frame P(x,y). In addition to determining significant areas of the prediction error frame based on structural properties of the prediction frame, this embodiment of prediction error encoder 2 analyses properties of the motion vectors describing estimated displacements of each pixel from frame to frame due to motion in the video scene, for determining the significant areas of the prediction error frame which are to be transmitted to the decoder. If the determination of significant areas is based both on structural characteristics of the prediction frame, e.g. edges and discontinuities, as well as on the motion vectors, those areas of the prediction error frame can be determined which describe motions of contours of moving objects. Alternatively, such determination of significant areas of the prediction error frame can be based on the structural characteristics of the prediction frame or on the motion vectors. In these less preferable cases it is still possible to determine some of the insignificant areas of the prediction error frame.

The prediction error encoder 2 of this embodiment furthermore adopts an adaptive coding scheme for each area of the prediction error frame E(x,y) determined to be significant. Selection of an individual coding scheme for each area is performed based on a classification of structural characteristics, e.g. orientation of contours of the prediction frame P(x,y). Each class has assigned a coding method adapted to the properties of the class. As the prediction frame P(x,y) is available both in the video encoder and in the video decoder, selecting an adapted coding scheme based on these properties is advantageous in that even if no additional selection information is included in the encoded prediction error data, the video decoder is able to select for each area to be encoded an appropriate decoding scheme matching the respective coding scheme selected by the video encoder.

Accordingly, the prediction error encoder 2 of this embodiment takes advantage of the availability of the prediction frame $P_n(x,y)$ and the motion vectors both in the video encoder and in the video decoder by means of using this information for determining the significant areas to be encoded of the prediction error frame En(x,y) and for selecting for each significant area of the prediction error frame E(x,y) an adapted coding scheme, without the need of transmitting address information regarding the location of the significant areas in the prediction error frame or information regarding the selected coding scheme.

Prediction error decoder 3 in FIG. 1 is advantageous but not necessary for principal reasons. If the coding schemes adopted for compressing the significant areas of the prediction error frame E(x,y) result in some loss of information, a part of this lost information can be retransmitted to the video decoder by means of basing the estimation of the motion vectors and the prediction of the video frames not on the actual incoming frame but on a restored video frame I*(x,y) which is obtained from a decoding operation identical to the decoding operation performed by the video decoder. This principle is well known in the art such that a further discussion of the significance of prediction error decoder 3 will be omitted here. In view of the similarity of prediction error decoding block 3 of FIG. 1 with the corresponding prediction error decoding block in the video decoder an explanation of structural and operational details of prediction error decoder block 3 will be given in the following in the context of the description of an embodiment of a video decoder according to the present invention.

Multiplexer 4 is an optional component for multiplexing the coded prediction error data output by prediction error encoder 2 and the motion vector data output by motion estimator 8. If separate transmission channels for prediction error data and motion vectors are available, multiplexer 4 may be omitted.

Figure 2:
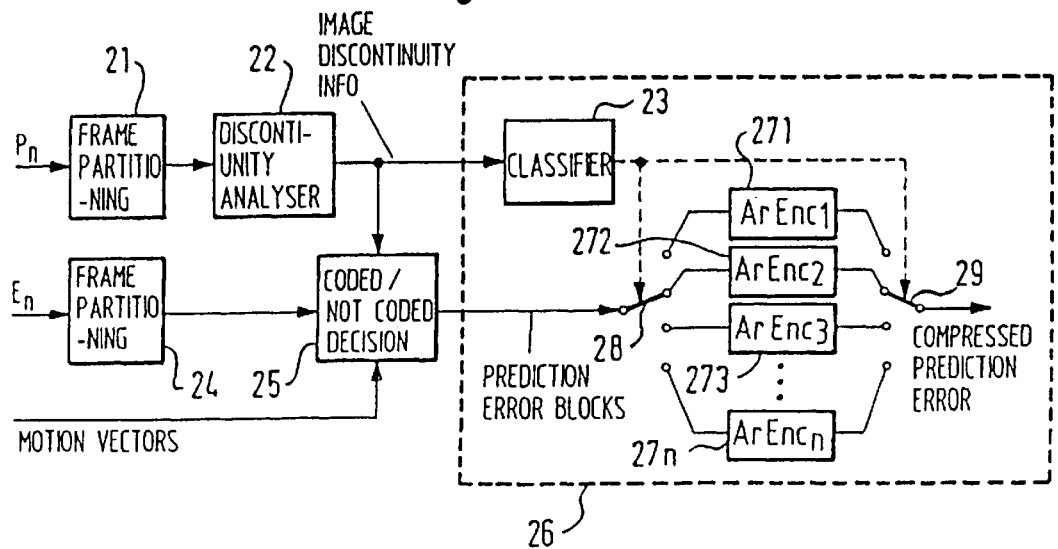
FIG. 2 shows a detailed block diagram of an embodiment of a prediction error encoder according to the present invention.

FIG. 2 shows a detailed block diagram of the prediction error encoder 2 of FIG. 1. In FIG. 2, 21 denotes a block for partitioning the prediction frame P(x,y) into a plurality of areas. 22 denotes a block for analysing spatial discontinuities in each of the areas of the prediction frame P(x,y). In this particular embodiment, not limiting the scope of the invention, this block comprises directional high pass filters for performing filter operations on each of the areas resulting from frame partitioning of P(x,y). Other alternatives for implementing block 22 include edge detecting algorithms or algorithms evaluating the variance of image brightness values. Block 24 is provided for partitioning the prediction error frame E(x,y) into a plurality of areas in accordance with the partitioning of the prediction frame P(x,y).

Block 25 represents determination means deciding for each of the areas obtained from partitioning the prediction error frame $E_n(x,y)$ whether the respective area is a significant area and is to be encoded, or whether the respective area of the prediction error frame E is not significant and is accordingly not encoded. For deciding upon the significance of each area, block 25 receives outputs of the directional high pass filters in block 22 and moreover receives motion vectors corresponding to the respective area the significance of which has to be judged and determined. Block 25 adds the absolute values of the filter outputs in each area and compares the obtained sum with a first predetermined threshold. In this way block 25 can determine whether the respective area of the prediction frame P has a significant degree of discontinuity or not. Moreover, block 25 calculates a magnitude of the motion vectors of the respective area and compares the largest magnitude of the motion vectors with a second threshold in order to determine whether the motion activity in the respective area of the frame is significant or not. Block 25 determines the respective area to be significant if both the degree of discontinuity and the motion activity are found to be significant, and determines the respective area to be not significant if the degree of discontinuity is not significant or if the motion activity is not significant.

Moreover, block 25 applies a predetermined sequence rule for outputting the significant areas of the prediction error frame E to block 26 for compression and transmission to the video decoder (not shown in this figure). Specifically, in this particular embodiment, block 25 arranges all areas resulting from the partitioning operation of block 21 in an array of areas and scans this array line by line looking for significant areas. Each significant area that is found, is then sequentially output to block 26. In this way the video decoder is able to locate received areas of the prediction error frame without the need of receiving information on the respective locations, as will be explained further below. Frame partitioning of the prediction frame P is performed by block 21 in a manner identical to partitioning the prediction error frame E by block 24, such that the determination of the significance of each of the areas of the prediction error frame E is based on the properties of the prediction frame in this area. In other words, frame partitioning by block 21 and by block 24 is performed such that corresponding areas of the prediction error frame and of the prediction frame comprise the same set of pixel coordinates (x,y). The prediction frame P and the prediction error frame E are partitioned into areas each having the same block size, e.g. 4×4 pixels or 8×8 pixels. It should be noted that the partitioning can follow a predetermined pattern or can be based on segmentation of the prediction image into irregularly shaped areas. Also in schemes where the encoder provides the decoder with information describing segmentation of the currently coded frame into arbitrarily shaped regions, the foresaid partitioning may be based on this segmentation.

Reference numeral 26 denotes an adaptive area encoder for compressing and encoding each area to be encoded of the prediction error frame E, i.e. each area determined by block 25 to be significant. Adaptive area encoder 26 includes a classification block 23 which in this particular embodiment, not limiting the scope of the invention, classifies each of the significant areas of the prediction frame into one of the classes: No discontinuities; horizontal discontinuities; vertical discontinuities; diagonal left slanted discontinuities; diagonal right slanted discontinuities; nondirectional discontinuities. Classification of each area in question of the prediction frame E takes place based on directional properties of the respective area of the prediction frame P, these properties being analyzed and extracted by means of the discontinuity analyser in block 22. Reference numeral 28 denotes a selector for selecting one of a plurality of selectable area encoders 271, . . . , 27n according to the classification of the respective area of the prediction frame E for encoding the respective area of the prediction error frame E. 29 denotes a selector for selecting the output of the selected area encoder and for connecting the output of the selected area encoder with the output of the video encoder for transmission to the video decoder.

Figure 3:
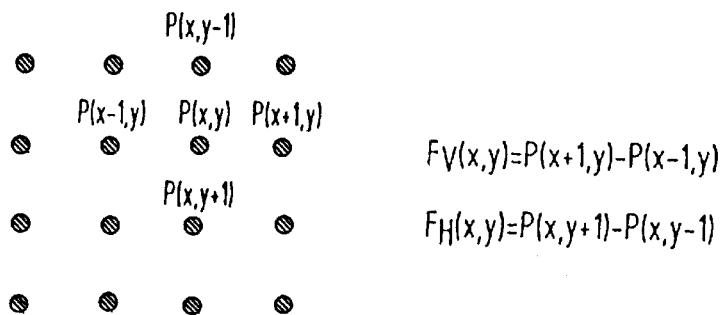
FIG. 3 shows an example of an area of the prediction error frame.

FIG. 3 shows an area of the prediction frame Pn for the purpose of illustrating the operation of directional high pass filter block 22 in FIG. 2. Each of the black dots in FIG. 3 represents one pixel in the depicted area of the prediction frame P. P(x,y) represents the luminance value of each the respective pixel with the pixel coordinates (x,y).

Block 22 in FIG. 2 extracts discontinuity information in each partitioned area by means of subtracting for each pixel location (x,y) the luminance value P of adjacent pixels opposing each other with respect to pixel location (x,y) in a predetermined direction. Specifically, block 22 includes a horizontal high pass filter calculating for each pixel location (x,y) of the respective area the difference $F_H(x,y)$ between the luminance value P(x,y+1) of one vertically adjacent pixel at location (x,y+1) and the luminance value P(x,y-1) of another vertically adjacent pixel position (x,y-1) opposite to said one pixel at location (x,y+1) with respect to location (x,y). Moreover, block 22 comprises a vertical high pass filter which calculates for each pixel position (x,y) the difference $F_V(x,y)$ between the luminance value of one horizontally adjacent pixel at location (x+1,y) and the luminance value of another horizontally adjacent pixel at location (x-1,y) opposite to said one horizontally adjacent pixel with respect to location (x,y).

The resulting horizontal and vertical differences $F_H(x,y)$ and $F_V(x,y)$ represent for each pixel location (x,y) a spatial luminance discontinuity in vertical and horizontal direction, respectively.

Block 22 supplies these vertical and horizontal discontinuity values $F_V(x,y)$ and $F_H(x,y)$ for each pixel of the respective area of the prediction frame P to block 25 which judges the significance of the discontinuity found in the respective area by means of adding up the absolute values of $F_V(x,y)$ and $F_H(x,y)$ over all pixel locations (x,y) of the respective area. If the resulting sum is larger than a predetermined threshold, block 25 determines the respective area of the prediction frame P to contain a significant amount of discontinuity, otherwise the respective area is determined not to contain significant discontinuities.

Figure 4:
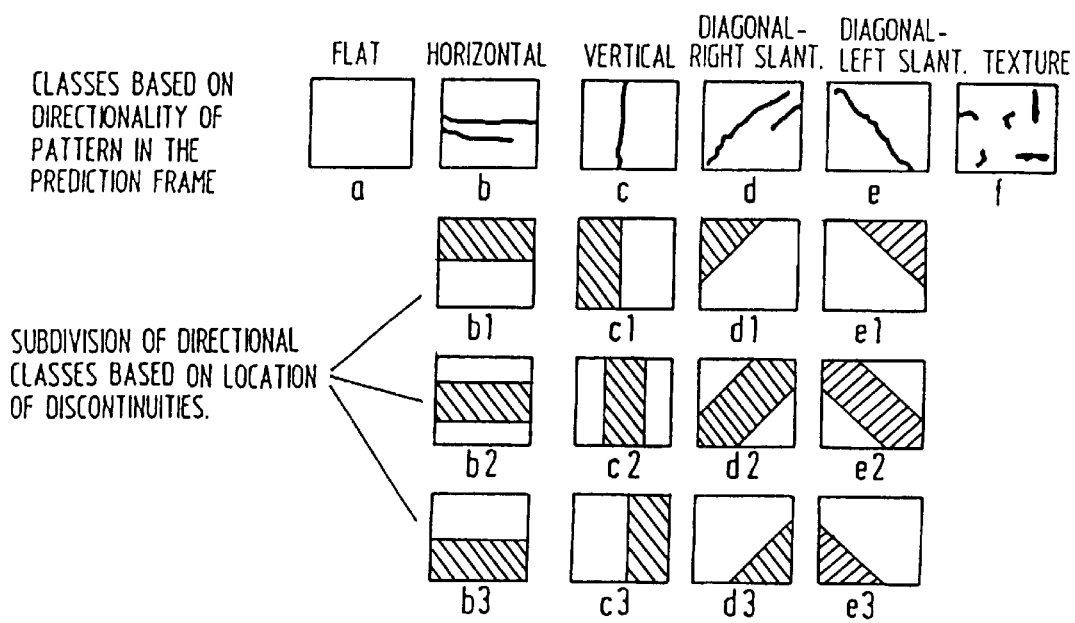
FIG. 4 shows examples of classes and subclasses of directionality patterns of prediction frame areas.

Classifier 23 in FIG. 2 receives the horizontal and vertical discontinuity values $F_H(x,y)$ and $F_V(x,y)$ output by the directional high pass filter 22 and uses these values for each area in question, to classify the area into one of six different classes depending on the structure of the discontinuities in the area. FIG. 4 shows typical representatives of members of each of the classes a to f. An area of the prediction frame is classified as belonging to class a if this area of the prediction frame does not show any substantial discontinuity, as is the case if in this area the luminance value changes gradually or not at all. A typical member of class b is an area showing horizontally oriented discontinuities, e.g. a horizontal edge. Class c represents areas of the prediction frame having vertically oriented discontinuities, e.g. a vertical edge. Classes d and e represent areas having diagonally oriented discontinuities like diagonal edges. Class d covers diagonal right slanted discontinuities while class e covers diagonal left slanted discontinuities. Finally, a typical member of class f is an area of the prediction frame that contains discontinuities without a directional orientation, e.g. texture.

Each of the directional discontinuity classes b to e is furthermore subdivided into subclasses based on the location of the respective discontinuities in the area. Taking class b as an example, a first subclass b1 covers horizontal discontinuities in the upper half of the area while subclass b2 covers horizontal discontinuities in the middle of the area. Subclass b3 covers horizontal discontinuities located in the bottom half of the area.

Similarly, for classes c, d and e a subdivision of these classes depends on the vertical and diagonal location of the discontinuities, respectively, as is evident from FIG. 4. It is to be noted here that the number of classes may of course vary e.g. depending on the number of selectable area encoders 271 to 27n and corresponding adapted coding methods used for the compression of prediction frame areas. Also, a number of different algorithms can be used for classifying each area based on values of filter outputs in this area. Examples of such algorithms are e.g. known from "FUNDAMENTALS OF DIGITAL IMAGE PROCESSING", M. K. Jain, Prentice Hall International 1989, pp. 347–357.

Based on this classification of each area of the prediction frame P determined by block 25 in FIG. 2 to be significant, classifier 23 then selects an appropriate area encoder among the selectable area encoders 271 to 27n, e.g. an appropriate vector quantizer, for adaptively encoding the area in question of the prediction error frame E. In this particular embodiment for each class or subclass there is provided a dedicated vector quantizer adapted to the specific statistical properties of the members of the respective class or subclass. Vector quantization as such is an established technique for compressing signals with some loss of information. Each of the vector quantizers $VQ_1 \ldots VQ_n$ replaces an area of the prediction error frame $E_n$ by its best approximation found in a code book belonging to this particular vector quantizer. Said code book is a set of a few representatives which are most likely to occur in the respective class or subclass, and it is sufficient that the vector quantizer outputs an index to the best matching code vector in the code book belonging to the respective vector quantizer.

According to the invention, classification of the areas of the prediction error frame is based on the corresponding prediction frame area. The prediction frame is available in the video decoder as well such that no classification information has to be included in the coded video data. Rather, this classification information can be retrieved by the video decoder by performing classification operations similar to the classification performed by the encoder.

It is to be noted here that other compression methods of prediction error frame areas can be adopted, e.g. orthogonal transform techniques (DCT, KLT) or matching pursuit techniques.

In the following another embodiment of a motion compensating video encoder according to the present invention will be discussed. This embodiment is similar to the first embodiment of a video encoder described above, except for the following.

Figure 5:
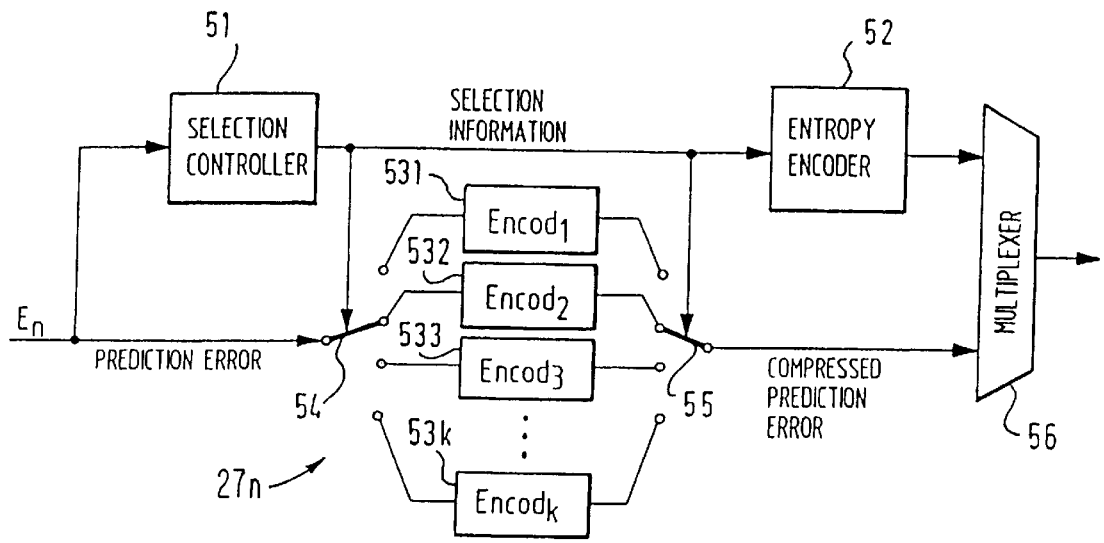
FIG. 5 shows a selectable area encoder of a video encoder according to a second embodiment of the present invention.

FIG. 5 shows an embodiment of each of the selectable area encoders 271 to 27n adopted in the second embodiment of the video encoder according to the present invention. As shown in FIG. 5, according to this embodiment each of the selectable area encoders 271 to 27n comprises a plurality of encoders 531 to 53k for performing a plurality of different coding methods. Each of the selectable area encoders 271 to 27n moreover includes a selection controller 51 for selecting among the plurality of respective encoders 531 to 53k, that encoder which is best suited according to an appropriate criterion for encoding a respective area of the prediction error frame. Selection controller 51 according to this particular embodiment not limiting the scope of the invention determines, which of the coding method available in the selectable area encoder selected by classifier 23 enables coding the respective area of the prediction error frame E with the lowest coding error. For this purpose selection controller 51 receives the prediction error frame E in order to be able to assess the coding error caused by each of the available encoders 531 to 53k of the selectable area encoder selected by classifier 23. If selection controller 51 finds more than one encoder among encoders 531 to 53k to perform satisfactorily, selection controller 51 chooses among these that encoder which achieves satisfactory performance with the lowest amounts of bits. Selection controller 51 outputs selection information to a selector 54 for activating the selected encoder to encode the respective area to be coded of the prediction error frame. Moreover, the selection information output by selection controller 51 is supplied to an entropy encoder 52 for entropy encoding the selection information. Also, the selection information controls a selector 55 for connecting the selected one of the encoders 531 to 53k with one of the inputs of a multiplexer 56 for multiplexing the entropy encoded selection information and the compressed prediction error data output by the selected encoder. The output of multiplexer 56 is the output of the respective one of the selectable area encoders 271 to 27n.

In this embodiment of a video encoder according to the present invention, classifier 23 shown in FIG. 2 classifies square-shaped areas of prediction frame P based on the variance of the image brightness values in each area of the prediction frame corresponding to the respective area of prediction error frame to be encoded. The variance varb the image brightness values is in this particular embodiment calculated by discontinuity analyser 22 as follows:

$$\text{var}_b = \sum_{i=0}^{M-1} \sum_{j=0}^{M-1} [p(i, j) - q]^2 \quad (1)$$

where p(i,j) is the brightness value of a pixel at location (i,j) in the respective area of the prediction frame, M is the number of pixels in each row and each column of the square-shaped area, and q is the average of the brightness values of pixels in the respective prediction frame area.

Figure 6:
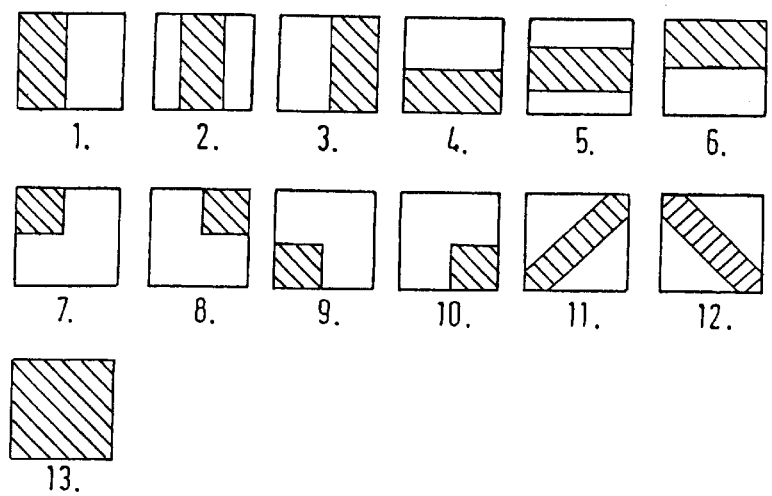
FIG. 6 shows examples of pixel clusters.

Then, discontinuity analyser 22 calculates for a plurality of predetermined pixel clusters in the respective area of the prediction frame a cluster activity measure CAM. Each cluster of pixels corresponds to one particular class that can be distinguished by classifier 23. FIG. 6 shows by way of example 13 different pixel clusters correspondig to 13 different property classes to be distinguished by classifier 23. Pixels belonging to a respective of the clusters 1 to 13 are shown shaded in FIG. 6.

In each cluster, the cluster activity measure CAM is in this particular embodiment calculated as follows:

For every pixel at a location (i,j) in the respective area a pixel activity measure pam (i,j) is calculated by means of analysing four 2×2 pixel sub-blocks containing pixel (i,j) The location of these sub-blocks for pixel (i,j) is shown in FIG. 7. Then, the variance of pixel values in each of these sub-blocks is calculated. These variances are denoted varlu, varru, varll and yarn. If the pixels of a sub-block reside outside the respective area, i.e. when position (i,j) is a boundary pixel of the area, then the variance of the sub-block is considered to be 0. The pixel activity measure in position (i,j) then is $$pam(i,j) = \max(varlu, varll, varru, varrl) \quad (2)$$

For each cluster (a) the cluster activity measure cam (a) can then be calculated as $$\text{cam}(a) = w(a) \sum_{(i,j) \in Ca} \text{pam}(i, j) \quad (3)$$

In this equation Ca denotes the set of pixels belonging to cluster a. The cluster activity measure is the sum of the pixel activity measures of all pixels in cluster a multiplied by a normalization factor w(a) of cluster a. For the clusters a=1 to a=13 shown in FIG. 6, the values of w(a) can be chosen as follows:

$$w(a) = \begin{cases} 1.0 & \text{if } a = 1, 2, \ldots, 6 \\ 1.4 & \text{if } a = 7, 8, \ldots, 10 \\ 1,2 & \text{if } a = 11, 12 \\ 0.7 & \text{if } a = 11 \end{cases} \quad (4)$$

In this particular embodiment, classifier 23 distinguishes 14 classes, and each area to be encoded is classified in accordance with one of these 14 classes, depending on the location of the dominant discontinuities of the image brightness in the respective area of the prediction frame. 13 classes respectively correspond to one of the 13 clusters shown in FIG. 6. The 14th class is not shown in FIG. 6 and is assigned to areas not containing any significant discontinuities.

The classification of the area of the prediction frame corresponding to an area to be encoded of the prediction error frame can then be performed as follows. If the variance of the area calculated according to equation (1) is smaller than a predetermined threshold, the area is considered not to contain significant discontinuities, and classifier 23 assigns class 14 to this area. On the other hand, if the variance of the area according to equation (1) is equal to or greater than said predetermined threshold, that cluster a is found, for which the cluster activity measure cam(a) is highest, indicating that the dominant discontinuities reside in that cluster a. Classifier 23 then assigns class a to this area.

In accordance with this classification classifier 23 selects one of the selectable area encoders 271 to 27n corresponding to the respective class.

According to this particular embodiment, each of the selectable area encoders 271 to 27n comprises a subset of encoders 531 to 53k from a set of 13 encoders, each of these 13 encoders being adapted to one of the 13 clusters of pixels shown in FIG. 6. Specifically, each of these 13 encoders is adapted to perform a two-dimensional discrete cosine transform on its associated cluster of pixels. The plurality of encoders 531 to 53k of each of the selectable area encoders 271 to 27n comprises that respective encoder which is adapted to the class of the respective selectable area encoder and furthermore comprises encoders adapted to classes related to the class of the respective selectable area encoder. For each class, all other classes can be regarded as related classes. Then, each of the selectable area encoders comprises the same set of encoders 531 to 53k. In general, for a particular class a different class is a related class if the probability that the classification of an area into the different class is better than the classification into the respective class, is not negligible. In this particular embodiment, it has been found that classes related to class 1 are classes 7, 9 and 13. Classes related to class 2 are classes 1, 3 and 13. Classes related to class 7 are classes 1, 4 and 13. Classes related to class 11 are classes 11 and 13. Classes related to class 13 are all other classes. The related classes of all other classes follow staightforwardly from symmetry considerations.

This embodiment of a video encoder according to the present invention takes advantage of the fact that the probabilities that an encoder not being the encoder corresponding to the class determined by classifier 23 performs better than the encoder corresponding to this class, are very low while the probability that the encoder corresponding to this class performs best, is high, such that the amount of coding method selection information to be transmitted to the video decoder is low and can be represented with few bits only. Encoding this selection information is performed by entropy encoder 52 on the basis of the respective selection probabilities for each selectable area encoder in a manner well known as such.

In general, related classes are chosen taking account the uncertainty involved in the classification of prediction error frame areas based on corresponding prediction frame areas. It is to be noted that while in this embodiment each of the related classes corresponds to a class of one of the selectable area encoders other possibilities exist for providing related classes. For instance, a particular class can have related classes which are not identical with any other class.

Figure 8:
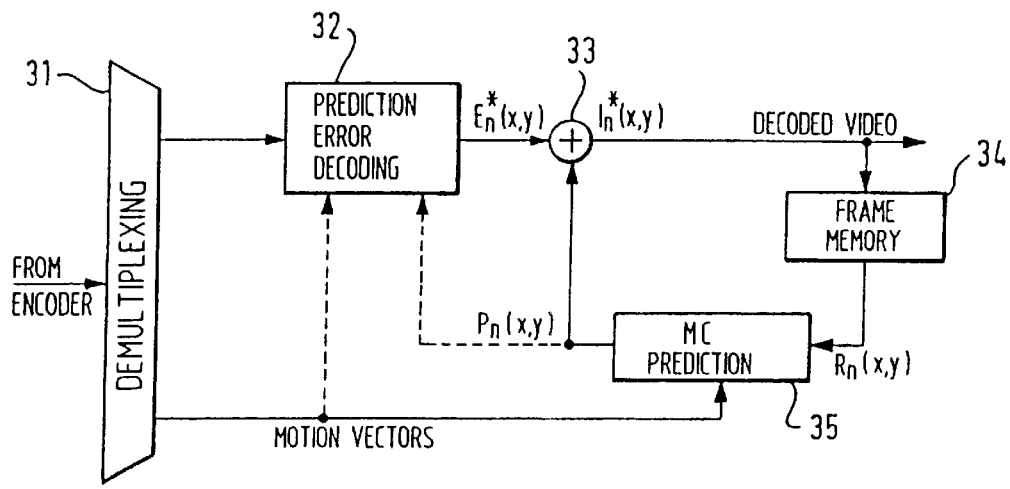
FIG. 8 shows a first embodiment of a video decoder according to the present invention.

FIG. 8 shows first embodiment of a video decoder according to the present invention. The video decoder is adapted to generate a prediction frame P in the same manner as the video encoder. Moreover, the video decoder extracts the same information from the prediction frame P that is used by the video encoder for encoding the prediction error frame, and uses this extracted information for decoding the received data and for restoring the prediction error frame E*.

Specifically, the decoder of FIG. 8 comprises a demultiplexer 31 for receiving coded video data from the video encoder and for demultiplexing the received data into prediction error data and motion vector data. Block 32 denotes a prediction error decoder for receiving the demultiplexed prediction error data and for restoring the prediction error frame E* from the received coded prediction error data. 33 denotes calculation means for calculating a restored video frame I* from the prediction frame P(x,y) and the restored prediction error frame E*. The restored video frame I* is stored in a frame memory 34 and is furthermore output by the video decoder as the decoded video data. 35 denotes a motion compensated predictor for constructing the prediction frame P from video frames stored in frame memory 34 serving as reference frames R and based on the motion vectors received from the video encoder and describing estimated pixel displacements in the current frame I. MC predictor 35 obtains the prediction frame P(x,y) using image brightness values of the reference frame R and these estimated pixel displacements.

Prediction error decoder 32 receives not only the coded prediction error data transmitted from the video encoder but furthermore receives the prediction frame P from MC predictor 35 and the motion vectors transmitted by the video encoder and performs prediction error decoding based on the prediction frame P and based on the motion vectors. This is indicated by the dashed lines in FIG. 8.

Based on the prediction frame P and on the motion vectors the prediction error decoder 32 is in a position to determine which of the areas of prediction error frame E are transmitted by the video encoder, taking advantage of the fact that significant information in the prediction error frame E concentrates approximately along the contours of the prediction frame P at locations where the motion activity is significant, and based on the property of the video encoder that only such significant areas of the prediction error frame are encoded. Since the prediction frame P generated by MC predictor 35 corresponds to the prediction frame P generated in the video encoder by MC predictor 7, the video decoder according to this embodiment of the present invention can perform prediction error decoding without the need of receiving information about the location of significant areas of the prediction error frame. Additionally or alternatively, the prediction error decoder 32 can perform adaptive decoding without the need of receiving classification information on each of the encoded prediction error frame areas because the decoder can retrieve this information from the prediction frame P in the same manner as the video encoder has used the prediction frame P for classifying the areas of the prediction error frame to be encoded.

Figure 9:
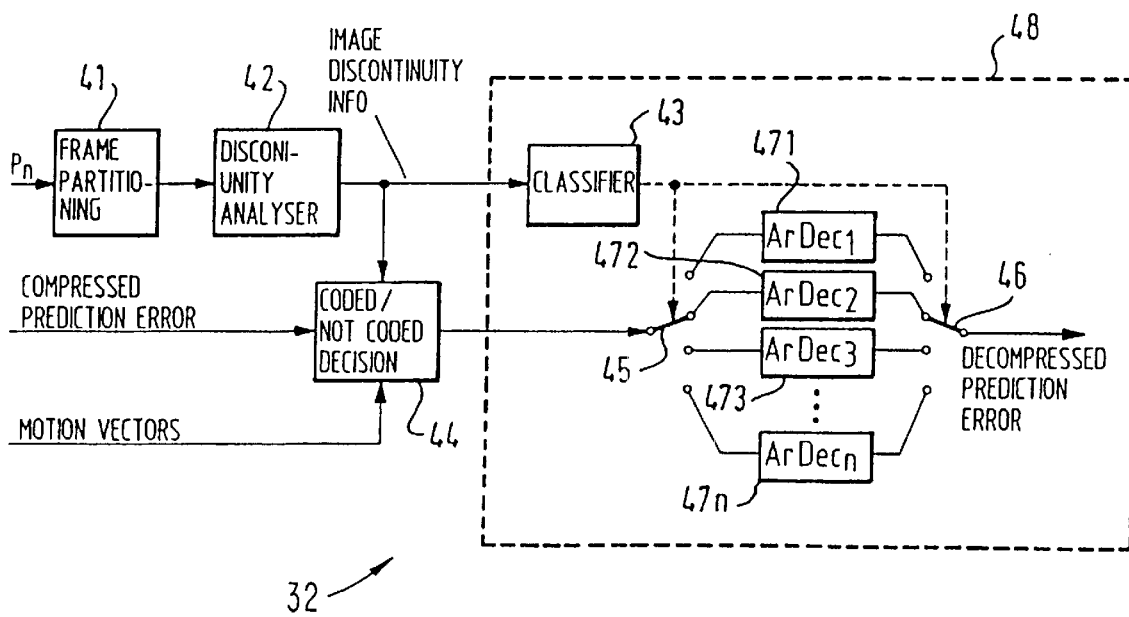
FIG. 9 shows a detailed block diagram of the prediction error decoder of FIG. 8.

FIG. 9 shows a detailed block diagram of the prediction error decoder 32 of FIG. 8. In FIG. 9, reference numeral 41 denotes means for partitioning the prediction frame P provided by MC predictor 35 into a plurality of areas. Partitioning of the prediction frame P takes place in the same manner as in the video encoder. In other words, the function of frame partitioning means 41 fully corresponds to the function of frame partitioning means 21 in the prediction error encoder of FIG. 1.

Reference numeral 42 denotes a discontinuity analyser the function of which corresponds to the function of discontinuity analyser 22 provided in the video encoder such that respective explanations regarding block 22 also hold for block 42 and therefore, will not be repeated here.

Block 44 in FIG. 9 denotes determination means for determining which areas of the prediction error frame have been encoded by the video encoder and are contained in the compressed prediction error data. For this purpose, determination means 44 performs an operation similar to the judgement and determination of significant areas performed by block 25 in FIG. 2. If the video decoder is designed for cooperation with the first embodiment of a video encoder described above, block 44 receives horizontal and vertical differences $F_H(x,y)$ and $F_V(x,y)$ output by discontinuity analyser 42 for each pixel location (x,y) of each area of the prediction frame $P_n$ provided by block 41 and judges the significance of the discontinuity found in each of the areas by means of adding up the absolute values of $F_V(x,y)$ and $F_H(x,y)$ over all pixel locations (x,y) of the respective area. In accordance with the judgement performed by block 25 in FIG. 2, block 44 determines the respective area of the prediction frame P to contain a significant amount of discontinuity if the resulting sum is larger than a predetermined threshold corresponding to the predetermined threshold adopted by block 25. Otherwise the respective area is determined by block 44 not to contain significant discontinuities.

Block 44 moreover receives the motion vectors transmitted by the video encoder. Based on these, block 44 judges for each area the amount of motion activity by means of calculating a magnitude of the motion vectors of the respective area and comparing the largest magnitude with a threshold corresponding to said second threshold employed by block 25 in FIG. 2 for corresponding operation. Block 25 determines an area of the prediction frame $P_n$ to be significant on the basis of the same criteria used by block 25, i.e. block 25 determines the respective area to be significant if both the degree of discontinuity and the motion activity in this area are found to be significant.

Figure 10A:
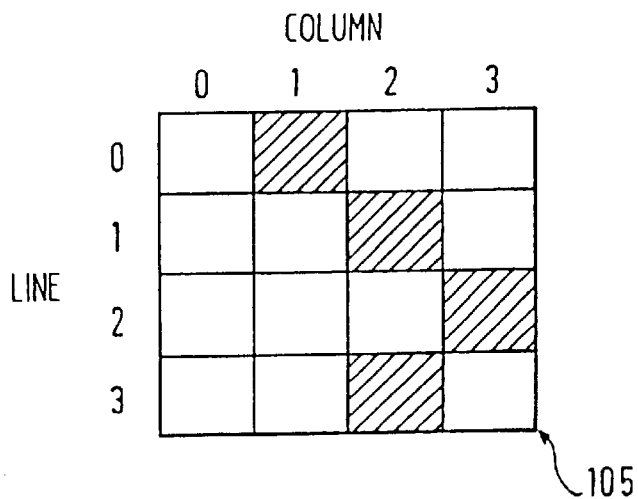
FIG. 10a illustrates an array of areas.
Figure 10B:
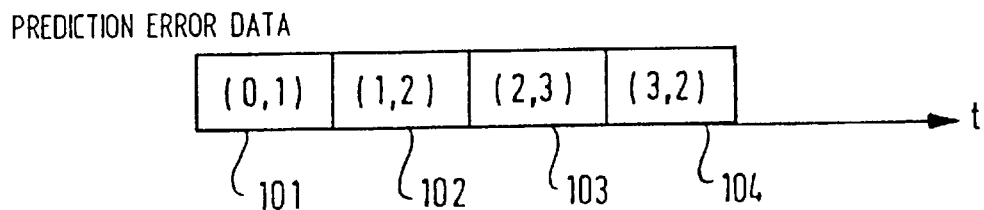
FIG. 10b illustrates an example of prediction error data.

Block 44 applies a predetermined sequence rule for assigning sections of the received prediction error data to the corresponding areas which rule corresponds to the predetermined sequence rule adopted by block 25 in the video encoder for outputting the significant areas of the prediction error frame. Specifically, in this particular embodiment block 44 arranges all areas resulting from the partitioning operation of block 425 in an array of areas similar to the array of areas arranged by block 25 in the video encoder and scans this array line by line looking for significant areas. Each received section of the prediction error data corresponding to one area of the prediction error frame is then assigned to that significant area the order of which in said array corresponds to the order of receipt of the respective section. An example of this operation is depicted in FIGS. 10a and 10b. FIG. 10a shows an array 105 of areas resulting from the partitioning operation performed by block 21 in the video encoder and by block 41 in the video decoder. The array consists of four columns 0 to 3 and four lines 0 to 3. The shaded elements of array 105 represent areas determined to be significant while the non-shaded areas represent non-significant areas.

FIG. 10 shows a stream of prediction error data received from the video encoder. This stream consists of sections 101 to 104, each section comprising the prediction error data for a corresponding area of the prediction error frame. The scanning operation performed by block 44 line by line on array 105 results in this example in the following order of significant arrays: (0,1); (1,2); (2,3); (3,2). This order corresponds to the order of the sections in the prediction error data. Based on these corresponding orders, block 44 can assign each received section 101 to 104 of the prediction error data to its corresponding area. t denotes the time axis.

Reference numeral 43 in FIG. 9 denotes a classifier that receives discontinuity information output from block 42. In this embodiment classifier 43 receives the vertical and horizontal discontinuity values $F_V(x,y)$ and $F_H(x,y)$ output by directional high pass filter 42 and performs an operation similar to the operation performed by classifier 23 provided in the video encoder. Accordingly, explanations about the classification performed by block 43 in a manner similar to the classification performed by block 23 will not be repeated here.

Reference numeral 45 denotes a selector controlled by classifier 43 for selecting the appropriate decoder for each section of the compressed prediction error data output by block 44 in accordance with the property class determined by classifier 43. In this way, adaptive area decoder 48 can perform an operation that is inverse to the coding operation performed by block 26 in the video encoder depending on the class of the respective area of the prediction frame $P_n$. Each selectable area decoder 471 to 47n of adaptive area decoder 48 in FIG. 9 corresponds to one of the selectable area encoders 271 to 27n in the video encoder. If vector quantization is employed, it includes a code book adapted to the class of areas to be decoded by each decoder 471 to 47n, and each of the decoders 471 to 47n is adapted to receive at its input an index to its code book which is the same as the code book used by the corresponding area encoder, and reads out the vector from the code book corresponding to the received index. Of course, the prediction error encoder and decoder may incorporate other adaptive prediction error encoding and decoding schemes in addition or as an alternative to vector quantisation, e.g. orthogonal transforms (DCT, KLT) or matching pursuit techniques.

Reference numeral 46 denotes a selector for connecting the output of the selected area decoder with the output of prediction error decoding block 32 in FIG. 9. Each of the decoded areas can then be written into a prediction error frame memory (not shown in the Figure) at the respective locations of the areas determined to be significant by block 44, thus restoring prediction error frame E*(x,y).

Figure 11:
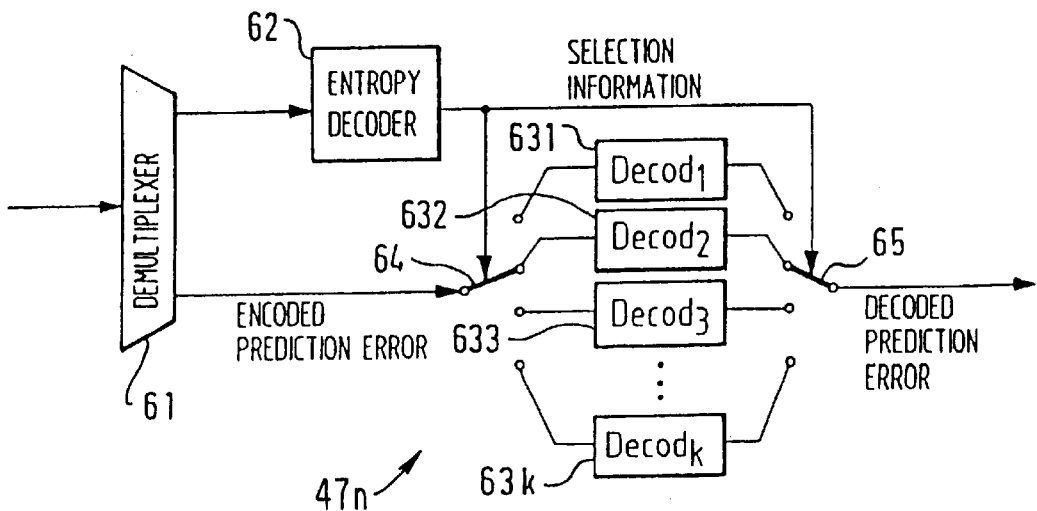
FIG. 11 shows a selectable area decoder of a video decoder according to a second embodiment of the present invention.

FIG. 11 shows a selectable area decoder of a video decoder according to a second embodiment of the present invention. The video decoder according to the second embodiment is adapted for cooperation with a video encoder according to the second embodiment described above. The video decoder according to the second embodiment is similar to the video decoder according to the first embodiment except that discontinuity analyser 42 and classifier 43 in FIG. 9 according to the second embodiment operate similar to discontinuity analyser 22 and classifier 23, respectively, of the video encoder according to the second embodiment, such that the description of structure and operation of these blocks need not be repeated here. Moreover, the selectable area decoders 471 to 47n in the video decoder according to the second embodiment differs as shown in FIG. 11 from the selectable area decoders of the first embodiment.

As shown in FIG. 11, each of the selectable area decoders 471 to 47n in a video decoder according to the second embodiment comprises a demultiplexer 61 for demultiplexing compressed prediction error data received from the video encoder of the second embodiment into encoded prediction error data and into entropy encoded coding method selection information. Reference numeral 62 denotes an entropy decoder receiving the entropy encoded coding method selection information. Reference numerals 631 to 63k denote a plurality of decoders each corresponding to one of the encoders 531 to 53k in the selectable area encoder corresponding to the respective selectable area decoder. Reference numerals 64 and 65 denote selectors controlled by the output of entropy decoder 62 for supplying the encoded prediction error data to a selected one of the plurality of decoders 631 to 63k and for connecting the output of the selected decoder with the output of the respective selectable area decoder.

The encoder and decoder for video data according to the present invention and the methods for encoding and for decoding video data according to the present invention can be advantageously used in a wide variety of applications. One of this wide variety applications is a system for transmitting video data, the system comprising an encoder according to the present invention, means for transmitting the encoded video data, and a decoder according to the present invention for receiving the transmitted video data and outputting the decoded video data.

Another advantageous application is a system for storing video data, this system comprising an encoder according to the present invention for encoding video data, means for storing encoded video data, and means for retrieving encoded video data from said storage means and for decoding and outputting said retrieved video data.

This invention can advantageously be used also in combination with different coding modes for different areas of the frames to be encoded. If some areas of a frame are subject to intra coding and other areas of the frame are subject to motion compensated encoding, the present invention is applicable to these motion compensation encoded areas, and the term motion compensated encoding of a video frame is not to be understood as a limitation to the case that all areas of the frame are MC encoded.

It is also clear for those skilled in the art that the present invention can be the basis for one or more coding modes in a video codec where it is used together with prior art coding modes. The encoder may decide to use one of the prior art modes when the determination of coded areas and coding schemes based on the present invention does not produce the desired result. For example, the encoder may override the choice of coded areas and the coding mode selection and communicate this decision to the decoder. This would require using capacity which would otherwise not be needed, but it can be justified if the consequent coding decision is significantly better.

What is claimed is:

1. Encoder for performing motion compensated encoding of video data, comprising:

means (8) for estimating motion vectors describing scene motion displacements of video frame pixels;

means (7) for predicting a video data frame (P) based on a first video data frame (R) and said motion vectors;

means (1) for calculating a prediction error frame (E) based on said predicted video data frame (P) and on a second video data frame (I);

means (2) for encoding said prediction error frame (E) and obtaining prediction error data;

means (4) for transmitting said motion vectors and said prediction error data to a decoder;

said means (2) for encoding said prediction error frame (E) comprising:

means (24) for partitioning said prediction error frame into a plurality of areas; and determination means for performing at least one of the following operations: determination of areas in said prediction error frame (E) to be encoded and determination of at least one coding scheme for each area to be encoded of said prediction error frame (E); and area encoding means (26) for encoding the areas to be encoded of said prediction error frame (E) in accordance with the at least one determination operation of said determination means;

wherein said determination means is adapted to analyse properties of said predicted video data frame (P) and to perform said at least one determination operation based on said analysis.

2. Encoder according to claim 1, characterized in that said determination means comprises means (22) for analysing for each area of said prediction error frame a discontinuity of the image brightness in a corresponding area of the predicted video data frame (P); and said determination means (2) is adapted to perform said at least one operation based on said discontinuity analysis.

3. Encoder according to claim 2, characterized in that said discontinuity analysing means (22) comprises:

a linear filter for calculating finite differences ($F_H$) in a vertical direction and a linear filter for calculating finite differences ($F_V$) in a horizontal direction in each area of the predicted video data frame (P); and means for comparing the sum of absolute values of the outputs of both filters in each area with a first predetermined threshold;

said determination means being adapted to determine that an area of the prediction error frame (E) is not to be encoded if said sum of absolute values calculated for the corresponding area of said predicted video data frame (P) does not exceed said first threshold.

4. Encoder according to claim 1, characterized in that:

said area encoding means (26) comprises selection means (28, 29) for individually selecting an area encoder ($27_1, \ldots, 27_n$) for each area determined to be encoded among a plurality of different area encoders.

5. Encoder according to claim 4, characterized in that:

said determination means comprises classifying means (23) for assigning one class of a group of property classes to each area to be encoded of said prediction error frame (E) depending on brightness discontinuity properties of the corresponding area of said predicted video data frame (P); and said selection means (28, 29) is adapted to select an area encoder ($27_1, \ldots, 27_n$) for each area to be encoded in accordance with the class assigned to the respective area.

6. Encoder according to claim 5, characterized in that:

said classifying means (23) is adapted to perform a classification based on output values provided by linear directional filters (22) for calculating finite differences ($F_H$) in a vertical direction and finite difference ($F_V$) in a horizontal direction in each area of the predicted video data frame (P) that corresponds to an area to be encoded of said prediction error frame (E).

7. Encoder according to claim 5, characterized in that said classifying means (23) is adapted to perform a classification based on respective brightness discontinuity concentrations in different pixel clusters of each area of the predicted video data frame (P) that corresponds to an area to be encoded of said prediction error frame (E).

8. Encoder according to claim 6, characterized in that:

said group of classes includes at least one of the following classes: no discontinuities; horizontal discontinuities; vertical discontinuities; diagonal left slanted discontinuities; diagonal right slanted discontinuities; non-directional discontinuities.

9. Encoder according to claim 1, characterized in that:

said area encoding means (26) is adapted to encode the data of each area to be encoded of said prediction error frame (E) by means of using selected orthogonal transformations or vector quantization or matching pursuit schemes.

10. Encoder according to claim 4, characterized by each area encoder (271, . . . , 27n) being adapted to comprise a plurality of coding methods (531 to 53k);

coding method selection means (51, 54, 55) provided for each area encoder (271, . . . , 27n) for selecting a coding method from the respective plurality of coding methods (531 to 53k) in accordance with a criterion related to the performance of the coding methods; and means (52, 56) for communicating the selection by said coding method selection means (51,54,55) to a video decoder.

11. Encoder according to claim 10, characterized in that said pluralities of coding methods (531, . . . , 53n) are different for different area encoders (271, . . . , 27n).

12. Encoder according to claim 1, characterized by:

a prediction error decoder (3) for decoding said prediction error frame (E); and means (5) for calculating said first video data frame (R) based on said predicted video data frame (P) and said decoded prediction error frame (E*).

13. Encoder according to claim 1, characterized in that:

said determination means (25) comprises means for calculating for each area of said predicted video data frame (P) a magnitude and/or direction of corresponding motion vectors; and said determination means (22, 25) is adapted to perform said determination based on the calculated magnitude and/or direction of said motion vectors.

14. Encoder according to claim 13, characterized in that:

said determination means is adapted to determine that an area of the prediction error frame (E) is not to be encoded if said calculated magnitude of said motion vectors corresponding to the area does not exceed a second predetermined threshold.

15. Method of motion compensated encoding of video data, comprising the steps:

estimating motion vectors describing scene motion displacements of video frame pixels;

predicting a video data frame (P) based on a first video data frame (R) and said motion vectors;

calculating a prediction error frame (E) based on said predicted video data frame (P) and a second video data frame input;

encoding said prediction error frame (E) and obtaining prediction error data;

transmitting said motion vectors and said prediction error data to a decoder;

said step of encoding said prediction error frame (E) comprising:

dividing said prediction error (E) frame into a plurality of areas;

performing at least one of the following determination operations: determining which of the areas in said prediction error frame (E) are to be encoded and determining a coding scheme for each area to be encoded of said prediction error frame (E); and encoding each area to be encoded of said prediction error frame (E) in accordance with said determination;

wherein said at least one determination operation is based on analysing properties of said predicted video data frame (P).

* * * * *